Patented Sept. 11, 1934

UNITED STATES PATENT OFFICE 1,973,001

AMINO - ANTHRAQUINONE SULPHO - CHLORIDES AND A PROCESS OF PREPARING THEM

Georg Kränzlein, Frankfort-on-the-Main, Hans Schlichenmaier, Kelkheim in Taunus, and Ludwig Schörnig, Frankfort - on - the - Main, Germany, assignors to General Aniline Works, Inc., New York, N. Y., a corporation of Delaware No Drawing. Application February 16, 1933, Serial No. 657,152. In Germany February 22, 1932

8 Claims. (Cl. 260—60)

The present invention relates to amino-anthraquinone sulphochlorides and to a process of preparing them, more particularly it relates to compounds of the general formula:

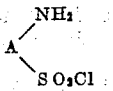

wherein A stands for an unsubstituted or substituted anthraquinone radical.

We have found that the hitherto unknown aminoanthraquinone sulphochlorides are obtainable by causing phosphorus pentachloride to react with an aminoanthraquinone sulphonic acid or a salt thereof, advantageously in the presence of phosphorus oxychloride. The smooth course of reaction could not be foreseen; it was rather to be expected that the free amino group would also be attacked by the said reaction.

Under suitable conditions the aminoanthraquinone sulphochlorides may be obtained in a well crystallized form. By the process of our present invention the said sulphochlorides have become easily accessible on a technical scale.

The reaction of the sulphonic acid or a salt thereof with phosphorus pentachloride is preferably carried out in the warmth and, if desired, in the presence of a diluent or a solvent. By using the free sulphonic acids, it is advantageous to add an alkali metal chloride.

For the preparation of the sulphochlorides according to the present invention there may be used as starting materials the unsubstituted aminoanthraquinone sulphonic acids as well as the aminoanthraquinone sulphonic acids which are further substituted in the anthraquinone nucleus.

The following examples serves to illustrate the invention but they are not intended to limit it thereto, the parts being by weight:

(1) To 220 parts of phosphorus oxychloride and 30 parts of 2-aminoanthraquinone-3-sodium sulphonate there are added 25 parts of phosphorus pentachloride and the whole is stirred for some time on the steam-bath at 50° C. to 60° C. Thereupon, 300 parts of chlorobenzene are added and the whole is again stirred for an hour at about 60° C. and filtered hot. On cooling, the sulphochloride precipitates from the filtrate in the form of light yellow small needles. By concentrating the mother liquor in vacuo, a further quantity of the acid chloride may be obtained. The sulphochloride melts at 207° C. to 208° C. On heating it with water, it is retransformed into 2-aminoanthraquinone-3-sulphonic acid. With amines it may be converted into the corresponding sulphamides. It is soluble in benzene, toluene, chlorobenzene and similar solvents. From a saturated hot benzene solution the 2-aminoanthraquinone-3-sulphonic acid chloride is obtained, on cooling, in the form of long, fine, light-yellow needles.

(2) To 1200 parts of phosphorus oxychloride, 108 parts of phosphorus pentachloride and 90 parts of sodium chloride there are added 171 parts of 1-amino-4-bromanthraquinone-2-sulphonic acid. The whole is heated for about 8 hours on the steam bath at 90° C. to 95° C., 300 parts of chlorobenzene are added and stirring is continued for 1 to 2 hours at about 90° C. to about 95° C. The reaction mixture is filtered with suction while hot and the residue is extracted by means of 300 parts of chlorobenzene. The filtrates are evaporated in vacuo while the crude sulphochloride is obtained with a good yield. By dissolving it in hot benzene, filtering and evaporating the filtrate in vacuo, the sulphochloride may easily be obtained in the form of well defined crystalline red-orange laminæ. It melts at about 207° C. It may be recrystallized from chlorobenzene and then melts at 209° C. to 210° C. The pure chloride is rather stable against water. With amines it easily yields the sulphamides, for instance, with aniline the anilide melting at 220° C., with oxyethylamine the oxyethylamide melting at 206° C. to 207° C. In both cases well defined crystals are obtained.

(3) To 175 parts of phosphorus oxychloride and 23 parts of phosphorus pentachloride there are added 35 parts of 1-aminoanthraquinone-2-sodium sulphonate. The mixture is then heated for about one hour on the steam-bath, while stirring. The undissolved part is filtered off, while hot, and the filtrate is evaporated in vacuo. The residue obtained is extracted by boiling with chlorobenzene. From the extract liquor the 1-aminoanthraquinone-2-sulphochloride is obtained by evaporation. Advantageously it is again recrystallized from benzene, whereby it is obtained, on concentration of the benzene solution, in the form of orange crystals of a melting point of 220° C.–222° C. The sulphochloride is decomposed by hot water. With bases it forms the corresponding 1-aminoanthraquinone-2-sulphamides, for instance, with oxyethylamine the 1-aminoanthraquinone-2-sulpho-oxyethylamide which may be crystallized from glacial acetic acid in the form of orange-yellow prisms melting at 227° C. to 228° C.

We claim:

1. The process of preparing aminoanthraquinone sulphochlorides which comprises causing phosphorus pentachloride to react with an ortho aminoanthraquinone sulphonic acid compound of the general formula:

wherein A stands for an anthraquinone radical and X for hydrogen or a metal atom.

2. The process of preparing aminoanthraquinone sulphochlorides which comprises causing phosphorus pentachloride to react with an ortho aminoanthraquinone sulphonic acid compound of the general formula:

wherein A stands for an anthraquinone radical and X for hydrogen or a metal atom in the presence of phosphorus oxychloride.

3. The process of preparing aminoanthraquinone sulphochlorides which comprises causing phosphorus pentachloride to react with an alkali metal salt of an ortho aminoanthraquinone sulphonic acid in the presence of phosphorus oxychloride at a temperature of about 50° C. to about 100° C.

4. The process of preparing aminoanthraquinone sulphochlorides which comprises causing phosphorus pentachloride to react with a mixture of an ortho aminoanthraquinone sulphonic acid and an alkali metal chloride in the presence of phosphorus oxychloride at a temperature of about 50° C. to about 100° C.

5. The compounds of the general formula:

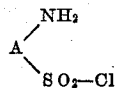

wherein A stands for an anthraquinone radical and the groups $NH_2$ and $SO_2.Cl$ stand in ortho-positions to each other.

6. The compound of the formula:

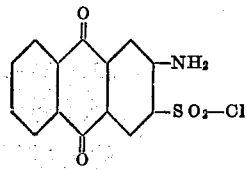

being soluble in benzene, toluene, chlorobenzene and similar solvents and crystallizing from a concentrated benzene solution in the form of small light yellow needles.

7. The compound of the formula:

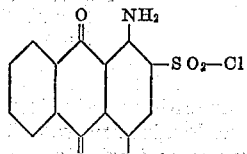

being a crystalline substance, having a red-orange color and showing when crystallized from chlorobenzene a melting point of 209° C. to 210° C.

8. The compound of the formula:

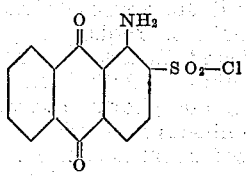

being easily soluble in benzene and crystallizing from a concentrated benzene solution in the form of orange crystals of a melting point of 220° C. to 222° C.

GEORG KRÄNZLEIN.
HANS SCHLICHENMAIER.
LUDWIG SCHÖRNIG.